Patented Jan. 8, 1924.

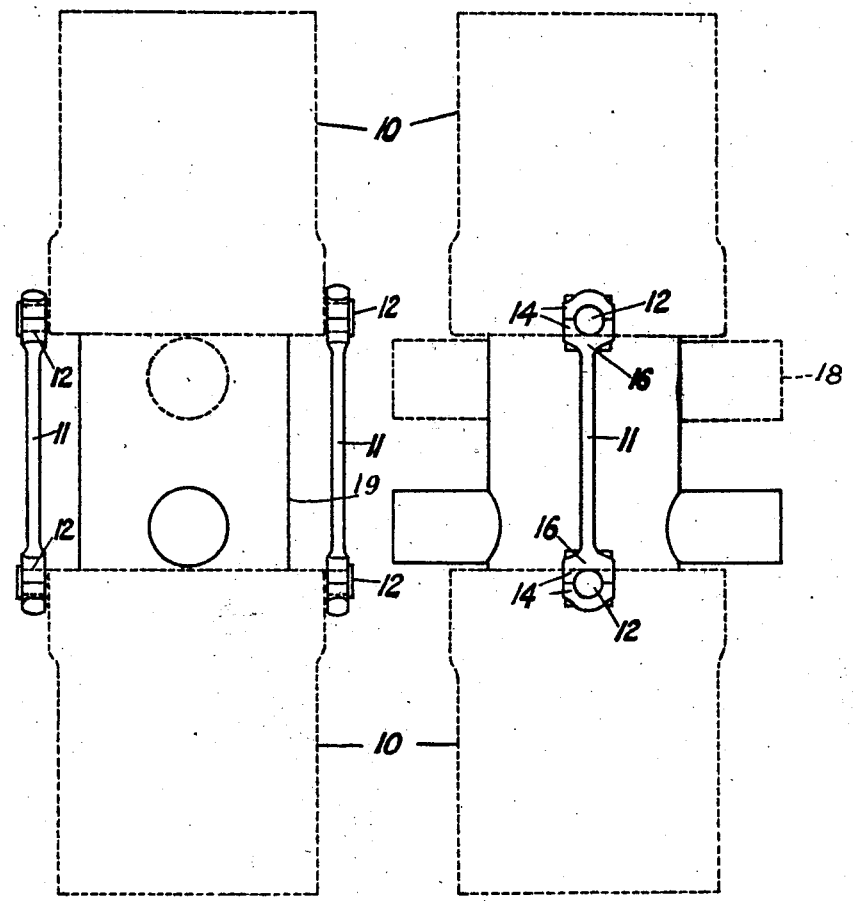

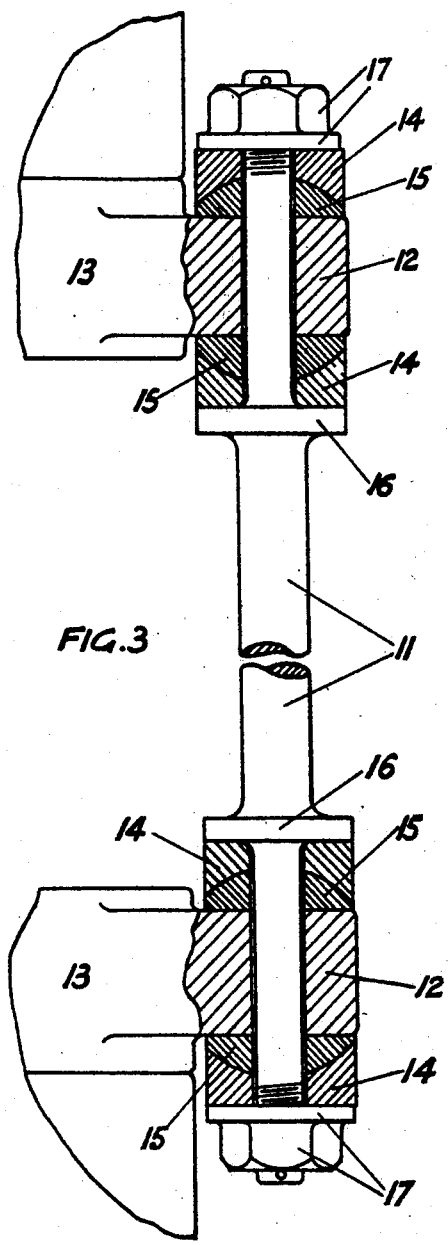

1,480,455

UNITED STATES PATENT OFFICE.

JOHN CAMPBELL MACCALL MACLAGAN, OF DRUMCHAPEL, SCOTLAND, ASSIGNOR TO NORTH BRITISH DIESEL ENGINE WORKS (1922) LIMITED, OF GLASGOW, SCOTLAND.

CYLINDER MORE PARTICULARLY THOSE FOR COMBUSTION ENGINES.

Application filed March 28, 1923. Serial No. 628,233.

*To all whom it may concern:*

Be it known that I, JOHN CAMPBELL MACCALL MACLAGAN, a subject of the King of Great Britain and Ireland, and a resident of Drumchapel, Scotland, have invented certain new and useful Improvements in Cylinders More Particularly Those for Combustion Engines, of which the following is the specification.

The invention relates to that type of double-acting cylinder more particularly for use in internal combustion engines in which is a trunk piston operated by a gudgeon pin passing out through gaps in the cylinder walls, and has for its object a cylinder of this type of improved and simplified construction in which are obtained certain advantages such as lightness.

A cylinder element made according to the invention comprises essentially two end members connected together at their inner ends by a separate and comparatively light structure permitting of the protrusion of the gudgeon pin.

This light structure consists of a series of links—for example, two diametrally opposite—lying parallel with the axis of the cylinder parts external to them, and pivoted at their ends upon them. The links may have either cylindrical or spherical bearings at their points of pivoting and may be provided with means for the adjustment of their length.

An example of the carrying out of the invention is shown on two accompanying sheets of explanatory drawings in which Figures 1 and 2 are diagrammatic elevations at right angles to one another of the two cylinder end members of a cylinder element with their connecting means, while Figure 3, Sheet 2, is a sectional elevation to an enlarged scale of a unit of the connecting means.

In this example the cylinder end members 10 are connected with one another by two diametrally opposed links 11 lying parallel with the axes of the cylinder parts, external to them, and pivoted at their ends upon trunnions 12 which may be either formed upon or secured to the cylinder.

According to an example of these links which is shown in Figure 3, the trunnions 12 are in this instance formed upon rings 13 embracing the inner ends of the cylinders 10 while the ends of the links 11 carry end caps 14 through which they pass with clearance and which end caps, spherical internally, embrace spheres 15 mounted upon the trunnions through which and the spheres the link ends also pass with clearance. These parts—the spheres and the caps—are held between butt elements 16 formed on the link (and under which packing may be inserted for the adjustment of lengthwise clearances) and washers and nuts 17 on the link ends.

It will be seen that this method of support provides ample space for the protrusion of the gudgeon pins 18 (dotted as at the opposite end of their stroke) of the piston 19.

What I claim is:—

1. A cylinder element more particularly for combustion engines comprising two end members connected together at their inner ends by a separate structure consisting of a series of links.

2. A cylinder element more particularly for combustion engines comprising two end members connected at their inner ends by two diametrically opposed links lying parallel with its axis.

3. A connecting link for the cylinder element forming the subject-matter of the foregoing claims hereof having between its ends and the cylinder end members coacting spherical elements.

In testimony whereof I have signed my name to this specification.

JOHN CAMPBELL MACCALL MACLAGAN.